United States Patent Office
3,574,211
Patented Apr. 6, 1971

3,574,211
1-(AMINO-MONOHALO-PHENYL)-2-AMINO-ALKANOLS AND SALTS
Johannes Keck, Gerd Kruger, and Hans Machleidt, Biberach, Riss, Klaus Noll, Warthausen-Oberhofen, and Gunther Engelhardt and Albrecht Eckenfels, Biberach, Riss, Germany, assignors to Boehringer Ingelheim G.m.b.H., Ingelheim am Rhein, Germany
No Drawing. Filed May 1, 1968, Ser. No. 725,945
Claims priority, application Germany, May 9, 1967, T 33,824
Int. Cl. C07c 91/22; C07d 57/36
U.S. Cl. 260—253
4 Claims

ABSTRACT OF THE DISCLOSURE 1-(amino-monohalo-phenyl)-2-amino-alkanols of the formula

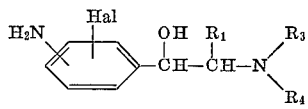

wherein $R_1$ is hydrogen or alkyl of 1 to 3 carbon atoms,
$R_3$ and $R_4$ are each hydrogen, lower alkyl, lower alkenyl, hydroxy-lower alkyl, lower alkoxy-lower alkyl, cyclohexyl, phenyl or benzyl, and
Hal is chlorine, bromine or iodine, and non-toxic, pharmacologically acceptable acid addition salts thereof, useful as analgesics in warm-blooded animals.

This invention relates to novel 1-(amino-monohalo-phenyl)-2-amino-lower alkanols and acid addition salts thereof, as well as to various methods of preparing these compounds.

More particularly, the present invention relates to a novel class of compounds of the formula

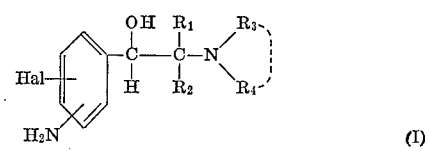

wherein

Hal is chlorine, bromine or iodine,
$R_1$ and $R_2$, which may be identical to or different from each other, are hydrogen or alkyl of 1 to 3 carbon atoms, and
$R_3$ and $R_4$, which may be identical to or different from each other, are hydrogen, straight or branched lower alkyl, lower alkenyl, hydroxy-lower alkyl, lower alkoxy-lower alkyl, di-lower alkylamino-lower alkyl, cycloalkyl, phenyl, benzyl or, together with each other and the nitrogen atom to which they are attached, pyrrolidino, lower alkyl-pyrrolidino, piperidino, lower alkyl-piperidino, piperazino, lower alkyl-piperazino, morpholino, lower alkyl-morpholino, hexamethyleneimino, lower alkyl-hexamethyleneimino, camphidino or lower alkyl-camphidino, and non-toxic, pharmacologically acceptable acid addition salts thereof.

The compounds according to the present invention may be prepared by a number of different methods involving well known chemical principles, among which the following have proved to be particularly convenient and efficient:

METHOD A

By ring halogenation of an aminophenyl-alkanolamine of the formula

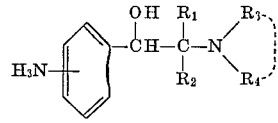

wherein $R_1$, $R_2$, $R_3$ and $R_4$ have the same meanings as in Formula I, except that $R_3$ and/or $R_4$ are other than lower alkenyl, with a conventional halogenating agent. The halogenation is advantageously carried out at a temperature between 0 and 100° C. in the presence of an inert organic solvent, such as dioxane, or in the presence of anhydrous or aqueous acetic acid.

Suitable halogenating agents are, for example, gaseous chlorine for introduction of a chloro-substituent, bromine or iodine bromide for introduction of a bromo-substituent, and iodine or iodine chloride for introduction of an iodo-substituent on the phenyl ring.

The starting compound of the Formula II can be employed in the form of the free base or also as an acid addition salt thereof, such as the mono- or dihydrochloride. Most advantageously, 1 mol or a small excess thereover of the halogenating agent is provided per mol of compound II.

This method is particularly suitable for the preparation of 2-amino-5-halo- and 4-amino-3-halo-phenyl compounds of the Formula I.

METHOD B

By de-acylating an acylamino-monohalophenyl-alkanolamine of the formula

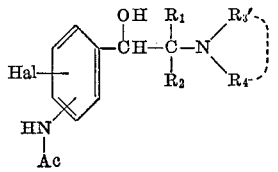

wherein Hal, $R_1$, $R_2$ and $R_4$ have the same meanings as in Formula I, Ac is acyl, and $R_3'$ has the same meanings as $R_3$ in Formula I and, in addition, acyl.

The de-acylation is effected pursuant to known methods, such as by heating compound III with a dilute mineral acid. In those cases where $R_3'$ is acyl, both of the acyl radicals are split off simultaneously, and the end product is a compound of the Formula I wherein $R_3$ is hydrogen.

METHOD C

By reacting a halohydrin of the formula

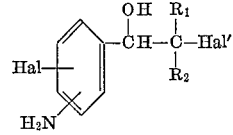

wherein Hal, $R_1$ and $R_2$ have the same meanings as in Formula I, and Hal' is chlorine, bromine or iodine, with an amine of the formula

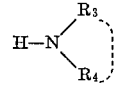

wherein $R_3$ and $R_4$ have the same meanings as in Formula I.

The reaction between compounds IV and V is carried out in the presence of a hydrogen halide-binding agent and, if desired, in the presence of an inert organic solvent, at room temperature or moderately elevated temperatures, such as at the boiling point of the particular solvent which is employed. Examples of suitable solvents are halogenated hydrocarbons, such as carbontetrachloride or chloroform; lower alkanols, such as ethanol or tert. butanol; or the like. Suitable hydrogen halide-binding agents are inorganic or tertiary organic bases, or also a commensurate excess of the amine of the Formula V, which may ismultaneously also serve as the solvent medium for the reaction.

METHOD D

By reducing an aminoketone of the formula

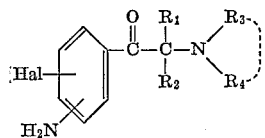

(VI)

wherein Hal, $R_1$, $R_2$, $R_3$ and $R_4$ have the same meanings as in Formula I, with the aid of a complex alkali metal hydride or an aluminum alkanolate, preferably in the presence of an inert organic solvent, such as methanol or isopropanol. Sodium borohydride is preferred as the complex alkali metal hydride, and aluminum isopropylate is the preferred aluminum alkanolate.

METHOD E

By partial de-halogenation of an amino-dihalo-phenyl-alkanolamine of the formula

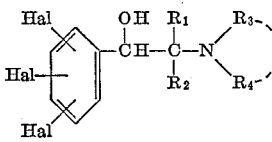

(VII)

wherein each Hal, which may be identical to or different from each other, and $R_1$, $R_2$, $R_3$ and $R_4$ have the same meanings as in Formula I.

The de-halogenation is effected pursuant to customary methods, preferably with the aid of catalytically activated hydrogen in the presence of a hydrogenation catalyst and an inert organic solvent, such as methanol. Depending upon the catalyst, the reaction is performed at room temperature or elevated temperatures, and at atmospheric or moderately elevated pressure; for instance, when Raney nickel is used as the catalyst, the de-halogenation proceeds at room temperature and atmospheric pressure.

METHOD F

For the preparation of a compound of the Formula I wherein the amino substituent is in the 2-position on the phenyl moiety and $R_1$ and $R_2$ are hydrogen, by reducing an amino-monohalo-phenyl-glyoxylic acid amide of the formula

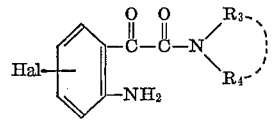

(VIII)

wherein Hal, $R_3$ and $R_4$ have the same meanings as in Formula I, with a complex alkali metal hydride, such as lithium aluminum hydride, in the presence of an inert organic solvent, such as diethylether or tetrahydrofuran.

METHOD G

For the preparation of a compound of the Formula I wherein the amino-substituent is in the 2-position of the phenyl ring and $R_1$ and $R_2$ are hydrogen, by reducing an amino-monohalo-phenyl-glycolic acid amide of the formula

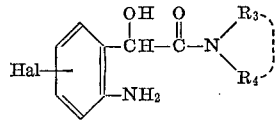

(IX)

wherein Hal, $R_3$ and $R_4$ have the same meanings as in Formula I, with a complex alkali metal hydride, preferably lithium aluminum hydride, in the presence of an anhydrous inert organic solvent, such as diethyl ether or tetrahydrofuran.

METHOD H

By reducing a nitro-monohalo-phenyl-alkanolamine of the formula

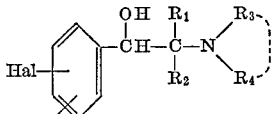

(X)

wherein Hal, $R_1$, $R_2$, $R_3$ and $R_4$ have the same meanings as in Formula I.

The reduction may be effected according to known methods, that is, by means of catalytically activated hydrogen in the presence of a hydrogenation catalyst, such as platinum or palladium; or by means of nascent hydrogen generated by contact of a mineral acid with a metal, such as zinc or tin, or with a metal halide, such as stannous chloride.

In essence, all of the compounds embraced by Formula I may be prepared by any one of methods A through H, with a few exceptions. The limitations of methods F and G have already been mentioned. Moreover, a compound of the Formula I wherein $R_3$ and $R_4$ are lower alkenyl may not be obtained by methods A or E.

The compounds embraced by Formula I are organic bases and therefore form acid addition salts with inorganic or organic acids. Thus, if the end product of methods A through H is a free base, this base may be converted into an acid addition salt thereof by customary methods, such as by dissolving the free base in a suitable solvent and acidifying the solution with the desired acid. On the other hand, if the end product is already an acid addition salt of the base, this salt may be converted into any other desired acid addition salt by converting the salt into the free base with the acid of an inorganic base, and thereafter acidifying the free base, for instance, with an alcoholic solution of the desired acid. Examples of non-toxic, pharmacologically acceptable acid addition salts of compounds of the Formula I are those formed with hydrochloric acid, hydrobromic acid, sulfuric acid, phosphoric acid, lactic acid, citric acid, tartaric acid, maleic acid, fumaric acid, 8-chlorotheophylline or the like. The free bases of the Formula I form acid addition salts with one, two or, if $R_3$ and $R_4$, form a group with an additional basic nitrogen atom, also with three equivalents of the particular acid.

The starting compounds of the Formulas II through X are either described in the literature or may be prepared by methods known from the literature. For instance, a compound of the Formula II may be obtained from a corresponding phenylethanolamine by nitration and subsequent reduction of the nitro group.

A compound of the Formula III may be prepared from a corresponding compound of the Formula II by acylation of the free amino group and subsequent halogenation of the aromatic ring.

A compound of the Formula IV may be obtained by reducing a corresponding aminoketone of the formula

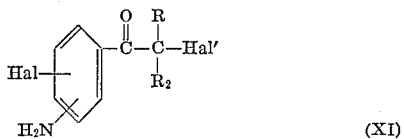
(XI)

wherein $R_1$, $R_2$ and Hal have the same meanings as in Formula I and Hal' has the same meanings as in Formula IV, pursuant to known methods, preferably with the aid of sodium borohydride in the presence of methanol.

A compound of the Formula VI may be prepared by reacting the corresponding compound of the Formula XI with an amine of the Formula V.

The preparation of a dihalophenyl compound of the Formula VII is described in copending application Ser. No. 668,953, filed Sept. 19, 1967.

A compound of the Formula VIII may be prepared, for example, by reacting a halogenated isatin derivative with a substituted amine.

A phenyl-glycolic acid derivative of the Formula IX may be obtained by reducing a compound of the Formula VIII with sodium borohydride.

Finally, a compound of the Formula X can be prepared by reducing a corresponding nitrophenyl-aminoalkylketone with sodium borohydride.

Using one of the above known methods, the following starting compounds, which have previously not been specifically described in the literature, were prepared:

1-(4'-amino-phenyl)-2-n-propylamino-ethanol, M.P. of its hydrochloride: 150–152° C.;

1 - (4' - amino-phenyl)-2-ethylamino-ethanol, M.P. 134–136° C.;

1 - (4' - amino-phenyl) - 2-diethylamino-ethanol, M.P. of its hydrochloride: 130–132° C.;

1 - (4' - acetamino - 3' - bromo-phenyl)-2-diethylamino-ethanol, M.P. 96–97° C.;

1 - (3' - acetamino - 4' - bromo-phenyl)-2-(ethylbenzyl-amino)-ethanol, whose hydrochloride was very hygroscopic and decomposed beginning at 80° C.;

1 - (2' - amino - 5' - bromo-phenyl) - 2 - bromo-ethanol, M.P. 94–96° C. (decomposition);

4 - amino - 3 - bromo - α - dimethylamino-acetophenone, M.P. of its hydrochloride: 237° C. (decomposition);

4 - amino - 3 - bromo-α-morpholino-acetophenone, M.P. 151–153° C.;

2 - amino - 5 - chloro-α-diethylamino-acetophenone, M.P. 153° C. (decomposition);

1 - (2' - amino - 3',5' - dibromo-phenyl)-2-diethylamino-ethanol, M.P. of its hydrochloride: 177–178° C.;

2 - amino - 5 - bromophenyl-glyoxylic acid diethylamide, M.P. 95–97° C.;

2 - amino - 5 - bromophenyl-glycolic acid diethylamide, M.P. 112–115° C.; and 1-(4'-bromo-3'-nitro-phenyl)-2 - diethylamino - ethanol, M.P. of its hydrochloride: 152–153° C.

The following examples further illustrate the present invention and will enable others skilled in the art to understand it more completely. It should be understood, however, that the invention is not limited solely to the particular examples given below.

EXAMPLE 1

Preparation of 1-(4'-amino-3'-bromo-phenyl)-2-n-propylamino-ethanol by method A 25.2 gm. of 1-(4'-amino-phenyl)-2 - n - propylamino-ethanol were dissolved in 520 cc. of dioxane, the solution was admixed with a solution of 7.3 gm. of potassium hydroxide in 260 cc. of water, and then, while stirring, a solution of 20.8 gm. of bromine in 208 cc. of dioxane was added dropwise at 14–16° C. Thereafter, the dioxane was distilled off in vacuo, the residue was extracted with benzene, the extract solution was dried with sodium sulfate and then filtered through charcoal, the filtrate was evaporated to dryness, and the residue was dissolved in a few cc.'s of a 40:10:1 mixture of chloroform, methanol and concentrated ammonia. The solution was chromatographed in the same solvent system through a silica gel column in order to separate undesirable side products from the reaction product. The eluate was evaporated, and the residue was recrystallized from ethylacetate, yielding 1-(4'-amino-3'-bromo-phenyl)-2-n-propylamino - ethanol, M.P. 133–134° C., of the formula

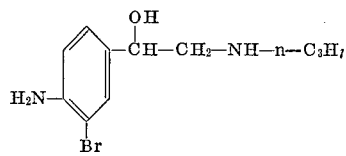

EXAMPLE 2

Preparation of 1-(4'-amino-3'-chloro-phenyl)-2-ethylamino-ethanol by method A 1.8 gm. of 1-(4'-amino-phenyl)-2-ethylamino-ethanol were dissolved in 20 cc. of glacial acetic acid, and the solution was admixed at 16° C. with a solution of 3.8 gm. of iodine and 2.4 gm. of bromine in 20 cc. of glacial acetic acid, whereby the temperature rose to 22° C. After about one minute of standing, the reaction mixture was poured into a mixture of 26 cc. of an aqueous 40% solution of sodium bisulfite and 50 cc. of water, the mixture was made alkaline with sodium hyroxide, and the alkaline mixture was extracted with ether. The ether extract solution was dried over sodium sulfate, filtered through charcoal, and the filtrate was evaporated in vacuo. The residue was recrystallized from acetone, yielding 1-(4'-amino-3'-bromo-phenyl)-2-ethylamino-ethanol, M.P. 147–149° C., of the formula

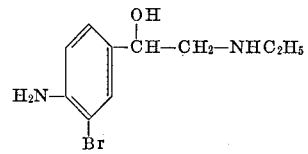

EXAMPLE 3

Preparation of 1-(4'-amino-3'-chloro-phenyl)-2-ethylamino-ethanol and its dihydrochloride by method A 15 gm. of 1-(4'-amino-phenyl)-2-ethylamino-ethanol hydrochloride were dissolved in 100 cc. of aqueous 50% acetic acid and, while stirring and cooling with ice water, a solution of 4.8 gm. of chlorine in 75 cc. of glacial acetic acid was added dropwise thereto. After about one hour of standing the reaction solution was diluted with 200 cc. of water, made alkaline with concentrated ammonia, and extracted three times with chloroform. The chloroform extract solutions were combined, dried with sodium sulfate and evaporated. The components of the dark residue were separated by elution from a silica gel column with chloroform, ethylacetate and acetone. The acetone fraction was evaporated, the residue was dissolved in 100 cc. of ether, and the solution was extracted three times with 2 N acetic acid. The aqueous acid phase was made alkaline with concentrated ammonia and extracted three times each with petroleum ether and methylenechloride. The methylene chloride extract solutions were combined, dried over sodium sulfate and evaporated. The residue was extracted three times with a 1:1 mixture of petroleum ether and ether, and the combined extract solutions were evaporated to dryness. The residue, 1-(4'-amino-3'-chloro-phenyl)-2-ethylamino-ethanol, was dissolved in absolute ethanol, the solution was acidified with ethanolic hydrochloric acid, and a small amount of acetone was added thereto, whereupon the dihydrochloride of 1-(4'-amino-3'-chlorophenyl)-2-ethylamino-ethanol, M.P. 140–141° C. (decomposition), of the formula

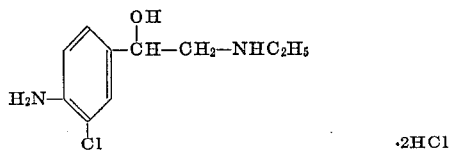

crystallized out.

EXAMPLE 4

Preparation of 1-(4'-amino-3'-iodo-phenyl)-2-diethylamino-ethanol and its dihydrochloride by method A 33 gm. of 1-(4'-amino-phenyl)-2-diethylamino-ethanol hydrochloride were dissolved in a mixture of 200 cc. of glacial acetic acid and 100 cc. of water and, while stirring, the solution was admixed dropwise with a solution of 33 gm. of iodine chloride in 50 cc. of glacial acetic acid. Thereafter, the reaction mixture was stirred for two hours at about 60° C., and then a solution of 8 gm. of sodium bisulfite in a little water was added dropwise, whereby a dark brown precipitate was formed. The precipitate was filtered off, the filtrate was made alkaline with concentrated ammonia while cooling with ice, and the alkaline solution was extracted three times with chloroform. The combined chloroform extract solutions were dried over sodium sulfate and evaporated. The components of the residue were separated by chromatography in a silica gel column with chloroform and acetone as eluants. The acetone fraction was evaporated, and the residue, 1-(4'-amino-3'-iodo-phenyl)-2-diethylamino-ethanol, was dissolved in absolute ethanol. The solution was acidified with ethanolic hydrochloric acid, whereby the dihydrochloride of 1-(4'-amino-3'-iodo-phenyl)-2-diethylamino - ethanol, M.P. 147–149° C. (decomposition), of the formula

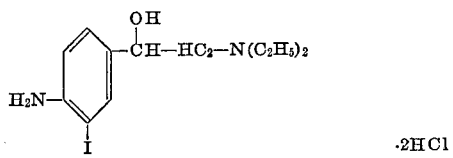

crystallized out.

EXAMPLE 5

Preparation of 1-(4'-amino-3'-bromo-phenyl)-2-diethylamino-ethanol by method B 10 gm. of 1(4'-acetamino-3'-bromo-phenyl)-2-diethylamino-ethanol were dissolved in 1 liter of 2 N hydrochloric acid, and the solution was heated at 70° C. for two hours. Thereafter, the reaction solution was allowed to cool to room temperature and was then made alkaline with sodium hydroxide and extracted with chloroform. The chloroform extract solution was filtered through charcoal and then dried over sodium sulfate and evaporated in vacuo. The almost colorless oil was identified to be 1(4'-amino-3'-bromo-phenyl)-2-diethylamino-ethanol. Its picrate had a melting point of 160–162° C., and its hydrochloride had a melting point of 143–144° C.

EXAMPLE 6

Preparation of 1-(2'-amino-5'-bromo-prenyl)-2-diethylamino-ethanol and its dihydrochloride by method C 7.5 gm. of 1-(2'-amino-5'-bromo-phenyl)-2-bromo-ethanol were dissolved in 150 cc. of diethylamine, and the solution was allowed to stand at room temperature for 36 hours. Thereafter, the reaction solution was evaporated in vacuo, the residue was taken up in ether, and the ethereal solution was washed with water, dried and evaporated in vacuo. The residue was purified by chromatography through a silica gel column with a 9:1 mixture of chloroform and methanol as the solvent. The fractions containing the desired reaction product were combined and evaporated, and the residue, 1-(2'-amino-5'-bromo-phenyl)-2-diethylamino-ethanol, was dissolved in n-propanol. The resulting solution was admixed with the calculated amount of isopropanolic hydrochloric acid, whereby a crystalline substance separated out which was recrystallized from n-propanol. It was identified to be the dihydrochloride of 1(2'-amino-5'-bromo-phenyl)-2-diethylamino-ethanol, M.P. 160–161° C. (decomposition), of the formula

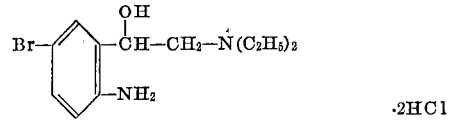

EXAMPLE 7

Preparation of 1-(4'-amino-3'-bromo-phenyl)-2-morpholino-ethanol by method D 2.5 gm. of 4-amino-3-bromo-α-dimethylamino-acetoone were dissolved in 85 cc. of methanol, and the solution was admixed at 15 to 20° C., while vigorously stirring, with small portions of a total of about 1 gm. of sodium borohydride. The reaction mixture was allowed to stand overnight, was then acidified with dilute hydrochloric acid, and the methanol was distilled off. The residue was made alkaline with sodium hydroxide, the alkaline solution was extracted with ether, the ethereal extract solution was dried and filtered through charcoal, and the filtrate was evaporated in vacuo. The residue was recrystallized from a mixture of benzene and cyclohexane, yielding 1-(4'-amino-3'-bromo-phenyl) - 2 - morpholino-ethanol, M.P. 137–138° C., of the formula

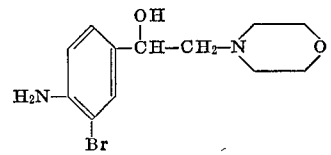

EXAMPLE 8

Preparation of 1(4'-amino-3'-bromo-phenyl)-2-dimethylamino-ethanol and its dihydrochloride by method D 2.5 gm. of 4-amino-3-bromo-α-dimethylamino-acetophenone were dissolved in 75 cc. of isopropanol, 4 gm. of aluminum isopropylate were added to the solution, and the mixture was boiled for eight hours while distilling off about 20 cc. of isopropanol through a distillation column. Thereafter, all of the remaining isopropanol was distilled off in vacuo, the residue was taken up in dilute hydrochloric acid, and the solution was made alkaline with sodium hydroxide and extracted with chloroform. The chloroform extract solution was dried and then evaporated to dryness. A yellow oil remained behind which crystallized after a short time; it was identified to be 1-(4'-amino - 3' - bromo-phenyl) - 2 - dimethylamino-ethanol. The free base was acidified with ethanolic hydrochloric acid, and the product was recrystallized from ethanol, yielding 1-(4'-amino - 3' - bromo-phenyl)-2-dimethylamino-ethanol dihydrochloride, M.P. 158–159° C., of the formula

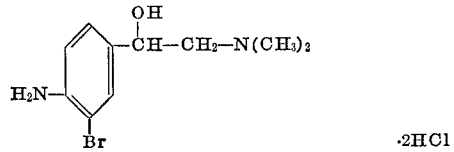

EXAMPLE 9

Preparation of 1-(2'-amino-5-bromo-phenyl)-2-diethylamino-ethanol and its dihydrochloride by method E 1.88 gm. of 1-(2'-amino-3',5'-dibromo-phenyl)-2-diethylamino-ethanol, prepared from its hydrochloride by liberation of the free base with 2 N ammonia and extraction with ether, were dissolved in 15 cc. of methanol, the solution was admixed with about 0.5 gm. of Raney nickel which had been moistened with methanol, and the mixture was shaken in an atmosphere of hydrogen. After absorption of about 1.2 equivalents of hydrogen the hydrogenation was terminated, the catalyst was filtered off, the filtrate was evaporated to dryness, the residue was taken up in ethyl acetate and the solution was washed with water. The organic phase was dried and again evaporated to dryness. The residue was dissolved in a few cc.'s of a 9:1:0.1 mixture of chloroform, methanol and concentrated ammonia and, for purification, the solution was chromatographed through a silica gel column with the same solvent system as the eluant. The combined pure fractions were evaporated in vacuo, leaving as a residue 1-(2'-amino-5-bromo-phenyl) - 2 - diethylamino-ethanol. The free base was converted into its dihydrochloride with the aid of isopropanolic hydrochloric acid and, after recrystallization from n-propanol, had a melting point of 160–161° C. (decomposition). The product was identical to that obtained in Example 6.

EXAMPLE 10

Preparation of 1-(2'-amino-5'-bromo-phenyl)-2-diethylamino-ethanol and its dihydrochloride by method F 5.7 gm. of 2 - amino - 5 - bromo - phenyl - glyoxylic acid diethylamide were suspended in 120 cc. of absolute ether. Thereafter, while stirring and under exclusion of moisture, 1.52 gm. of solid lithium aluminum hydride were added gradually to the suspension over a period of 15 minutes, and the mixture was allowed to stand at room temperature for two hours. Subsequently, the reaction solution was carefully admixed successively with 1.5 cc. of water, 2 cc. of 2 N of sodium hydroxide and 4.5 cc. of water, and the inorganic precipitate formed thereby was separated by vacuum filtration. The ethereal filtrate containing 1 - (2' - amino - 5' - bromo - phenyl)- 2 - diethylamino - ethanol was clarified with activated charcoal and then acidified with 5 cc. of 6.1 N isopropanolic hydrochloric acid. The precipitate formed thereby was collected and recrystallized from isopropanol/ether, yielding 1 - (2' - amino - 5' - bromo - phenyl) - 2 - diethylamino-ethanol, M.P. 160–161° C. (decomposition). The product was identical to that obtained in Examples 6 and 9.

EXAMPLE 11

Preparation of 1-(2'-amino-5'-bromo-phenyl)-2-diethylamino-ethanol and its dihydrochloride by method G 4.5 gm. of 2 - amino - 5 - bromo - phenyl - glycolic acid diethylamide were suspended in 100 cc. of absolute ether and, while stirring and under exclusion of moisture, 0.875 mgm. of lithium aluminum hydride was added in small portions at room temperature over a period of 15 minutes. The resulting mixture was allowed to stand overnight at room temperature, and then the complex compound formed thereby was decomposed by successive addition of 1.0 cc. of water, 1.2 cc. of 2 N sodium hydroxide and 3 cc. of water. The inorganic salts precipitated thereby were separated by vacuum filtration, and the filtrate, which contained 1- (2' - amino - 5' - bromophenyl) - 2 - diethylamino - ethanol, was acidified with 2.6 cc. of 6.1 N isopropanolic hydrochloric acid. The precipitate formed thereby was collected and recrystallized from isopropanol/ether in the presence of activated charcoal, yielding 1 - (2' - amino - 5' - bromo - phenyl)- 2 - diethylamino - ethanol dihydrochloride, M.P. 160– 161° C. (decomposition). The product was identical to that obtained in Examples 6, 9 and 10.

EXAMPLE 12

Preparation of 1-(3'-amino-4'-bromo-phenyl)-2-diethylamino-ethanol by method H 26.0 gm. of 1 - (4' - bromo -3' - nitro - phenyl) - 2 - diethylamino-ethanol hydrochloride were gradually introduced over a period of 30 minutes into a solution of 50 gm. of $SnCl_2 \cdot 2H_2O$ in 75 cc. of concentrated hydrochloric acid while stirring and maintaining the temperature at about 70° C. by exterior cooling. Thereafter, the reaction mixture was allowed to cool to room temperature, then covered with ethyl acetate, and the aqueous phase was made alkaline with concentrated sodium hydroxide. The aqueous and organic phases were separated from each other, and the aqueous phase was extracted twice with ethyl acetate. The extract solutions were combined with the organic phase, washed with water, dried and evaporated to dryness, leaving as a residue a thin-layer chromatographically uniform oil ($R_f$=0.5; $SiO_2$, chloroform: methanol=9:1) which was identified to be 1 - (3' - amino- 4' - bromo - phenyl) - 2 - diethylamino - ethanol. Its monopicrate (recrystallized from absolute ethanol) had a melting point of 143–144° C.

EXAMPLE 13

Using a procedure analogous to that described in Example 1, 1 - (4' - amino - 3' - bromo - phenyl) - 2 - methylamino-ethanol, M.P. 135.5–136.5° C., was prepared from 1-(4'-amino-phenyl)-2-methylamino-ethanol.

EXAMPLE 14

Using a procedure analogous to that described in Example 7, 1 - (4' - amino - 3' - bromo - phenyl) - 2 - (N'-methyl-piperazino)-ethanol of the formula

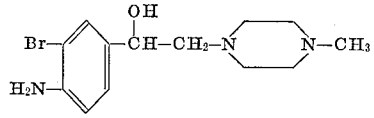

was prepared from 4 - amino - 3 - bromo - α - (N'-methyl-piperazino)-acetophenone. Melting point of trihydrochloride: Decomposition beginning at 240° C.

EXAMPLE 15

Using a procedure analogous to that described in Example 7, 1 - (4' - amino - 3' - bromo - phenyl) - 2 - pyrrolidino-ethanol of the formula

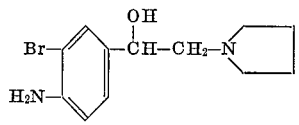

was prepared from 4 - amino - 3 - bromo - α - pyrrolidino-acetophenone. Melting point of dihydrochloride: Decomposition beginning at 150° C.

EXAMPLE 16

Using a procedure analogous to that described in Example 7, 1 - (4' - amino - 3' - bromo - phenyl) - 2 - piperidino-ethanol of the formula

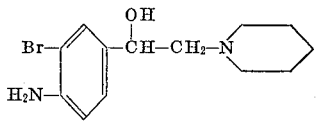

was prepared from 4 - amino - 3 - bromo - α - piperidino-acetophenone. Melting point of dihydrochloride: Decomposition beginning at 150° C.

EXAMPLE 17

Using a procedure analogous to that described in Example 7, 1 - (2' - amino - 5' - chloro - phenyl) - 2 - diethylamino-ethanol of the formula

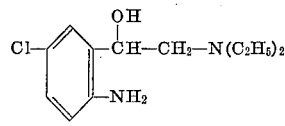

was prepared from 2 - amino - 5 - chloro - α - diethylamino-acetophenone dihydrochloride. Melting point of dihydrochloride: 171–173° C. (decomposition).

EXAMPLE 18

Using a procedure anologous to that described in Example 5, 1-(3'amino-4'-bromo - penyl) - 2 - (ethyl-benzyl-amino)-ethanol, an amorphous, thin-layer chromatographically uniform ($R_f=0.8$; $SiO_2$, ethyl acetate) substance without a definite melting point, of the formula

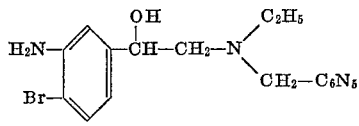

was prepared from 1-(3'-acetylamino-4'-bromo-phenyl)-ethanol hydrochloride.

EXAMPLE 19

Using a procedure anologous to that described in Example 1, 1-(4'-amino-3-bromo-phenyl) - 2 - dimethyl-aminoethanol of the formula

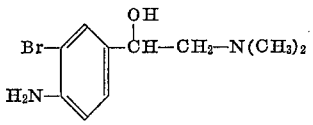

was prepared from 1-(4'-amino-phenyl) - 2 - dimethyl-ethanol. M.P. of dihydrochloride: 158–159° C.

EXAMPLE 20

Using a procedure analogous to that described in Example 7, 1-(4'-amino-3'-bromo-phenyl)-2-(methyl-cyclohexyl-amino)-ethanol of the formula

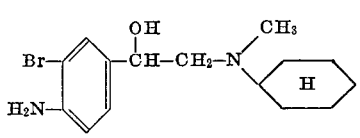

was prepared from 4-amino-3-bromo - α - (methyl - cyclohexylamino)-acetophenone. M.P. of monohydrochloride: 65° C.

EXAMPLE 21

Using a procedure analogous to that described in Example 7, 1-(4'-amino - 3' - bromo - phenyl) - 2 - (methyl-benxylamino)-ethanol, M.P. 88–91° C. of the formula

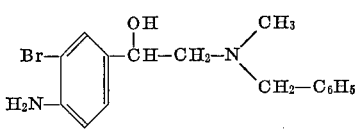

was prepared from 4-amino-3-bromo - α - (methyl - benyl-amino)-acetophenone.

EXAMPLE 22

Using a procedure analogous to that described in Example 7, 1-(4'-amino-3'-bromo-phenyl)-2-dibenzylamino-ethanol, M.P. 133–136° C., of the formula

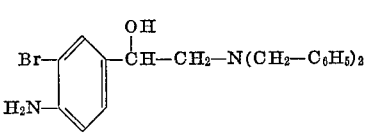

was prepared from 4-amino-3-bromo - α - dibenzylamino-acetophenone.

EXAMPLE 23

Using a procedure analogous to that described in Example 7, 1-(4'-amino-3'-bromo-phenyl) - 2 - camphidino-ethanol, M.P. 112–114° C., of the formula

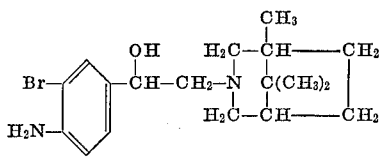

was prepared from 4-amino - 3 - bromo - α - camphidino-acetophenone.

EXAMPLE 24

Using a procedure analogous to that described in Example 7, 1-(4'-amino-3'-bromo-phenyl) - 2 - diallylamino-ethanol of the formula

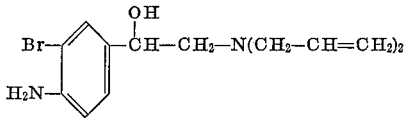

was prepared from 4-amino - 3 - bromo - α - diallylamino-acetophenone. M.P. of hydrochloride: 80–100° C.

EXAMPLE 25

Using a procedure analogous to that described in Example 7, 1-(4'-amino-3'-bromo - phenyl) - 2 - (methyl-β-hydroxy-ethyl-amino)-ethanol of the formula

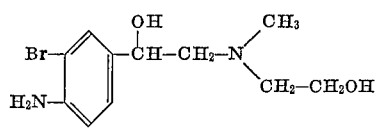

was prepared from 4-amino-3-bromo-α-(methyl - β - hydroxyethylamino)-acetophenone, M.P. of hydrochloride: 105–108° C.

EXAMPLE 26

Using a procedure analogous to that described in Example 7, 1-(4'-amino-3'-chloro-phenyl) - 2 - pyrrolidino-ethanol, M.P. 109–110° C., was prepared from 4-amino-3-chloro-α-pyrrolidino-acetophenone.

EXAMPLE 27

Using a procedure analogous to that described in Example 7, 1-(4'-amino-3'-chloro-phenyl) - 2 - camphidino-ethanol, M.P. 134–135° C., was prepared from 4-amino-3-chloro-α-camphidino-acetophenone.

EXAMPLE 28

Using a procedure analogous to that described in Example 7, 1-(4'-amino-3'-chloro-phenyl) - 2 - ethylamino-ethanol, M.P. 140–141° C., was prepared from 4-amino-3-chloro-α-ethylamino-acetophenone.

EXAMPLE 29

Using a procedure analogous to that described in Example 7, 1-(4'-amino-3'-bromo - phenyl) - 2 - isopropyl-amino-ethanol, M.P. 168–169° C., of the formula

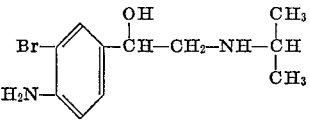

was prepared from 4-amino-3-bromo-α-isopropylamino-acetophenone.

EXAMPLE 30

Using a procedure analogous to that described in Example 7, 1-(4'-amino-3'-bromo - phenyl) - 2 - diisopropyl-amino-ethanol was prepared from 4-amino-3-bromo-α-diisopropylamino-acetophenone. M.P. of picrate: 176–178° C.

EXAMPLE 31

Using a procedure analogous to that described in Example 7, 1-(4'-amino - 3' - bromo - phenyl) - 2 - (methylphenyl-amino)-ethanol, M.P. 108–109° C., of the formula

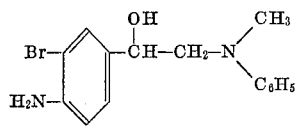

was prepared from 4-amino-3-bromo-α-(methyl-phenylamino)-acetophenone.

EXAMPLE 32

Using a procedure analogous to that described in Example 7, 1-(4'-amino-3'-chloro-phenyl)-2-diethylaminoethanol was prepared from 4-amino-3-chloro - α - diethylamino-acetophenone. M.P. of dihydrochloride: 78° C. (decomp.).

EXAMPLE 33

Using a procedure analogous to that described in Example 7, 1-(4'-amino-3'-bromo-phenyl) - 2 - ethylaminoethanol, M.P. 147–149° C., was prepared from 4-amino-3-bromo-α-ethylamino-acetophenone.

EXAMPLE 34

Using a procedure analogous to that described in Example 1, 1-(4'-amino-3'-bromo-phenyl)-2-diethylaminoethanol was prepared from 1-(4'-amino-phenyl)-2-diethylamino-ethanol. M.P. of monopicrate: 160–162° C.

EXAMPLE 35

Using a procedure analogous to that described in Example 6, 1-(4' - amino-3'-bromo-phenyl)-2-pyrrolidinoethanol was prepared from 1-(4'-amino-3'-bromo-phenyl)-2-bromo-ethanol. M.P. of dihydrochloride: Decomposition beginning at 150° C.

EXAMPLE 36

Using a procedure analogous to that described in Example 9, 1-(4'-amino-3'-bromo-phenyl)-2-dimethylaminoethanol was prepared from 1-(4'-amino-3',5'-dibromo-phenyl)-2-dimethylamino-ethanol. M.P. of dihydrochloride: 158–159° C.

EXAMPLE 37

Using a procedure analogous to that described in Example 7, 1 - (4'-amino-3'-bromo-phenyl)-2-diethylaminoethanol was prepared from 4-amino-3-bromo-α-diethylaminoacetophenone. M.P. of hydrochloride: 143–144°. C.

EXAMPLE 38

Using a procedure analogous to that described in Example 7, 1-(2' - amino-5'-bromo-phenyl)-2-amino-ethanol was prepared from 5-bromo-2,α-diamino-acetophenone. M.P. of dihydrochloride: 215–220° C. (decomp.).

EXAMPLE 39

Using a procedure analogous to that described in Example 7, 1-(4'-amino-3'-bromo-phenyl)-2-hexamethyleneimino-ethanol of the formula

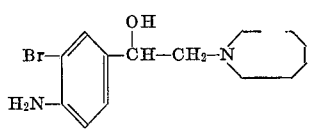

was prepared from 4-amino-3-bromo-α-hexamethyleneimino-acetophenone. M.P. of dihydrochloride: 154–157° C.

EXAMPLE 40

Using a procedure analogous to that described in Example 7, 1-(4'-amino-3'-bromo-phenyl)-2-piperidino-butanol, M.P. 110–112° C., of the formula

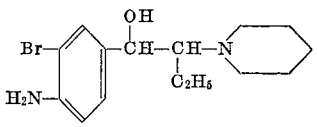

was prepared from 4-amino-3-bromo-α-piperidino-butyrophenone.

EXAMPLE 41

Using a procedure analogous to that described in Example 7, 1-(4'-amino-3'-bromo-phenyl)-2-pyrrolidino-butanol, M.P. 111–113° C., was prepared from 4-amino-3-bromo-α-pyrrolidino-butyrophenone.

EXAMPLE 42

Using a procedure analogous to that described in Example 7, 1-(4'-amino-2'-chloro-phenyl)-2-morpholino-ethanol of the formula

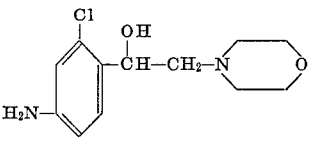

was prepared from 4-amino-2-chloro-α-morpholino-acetophenone hydrochloride. M.P. of hydrochloride of ethanol compound: 185° C. (decomp.).

EXAMPLE 43

Using a procedure analogous to that described in Example 7, 1-(3'-amino-4'-chloro-phenyl)-2-tert.-butylamino-ethanol. M.P. 137–139° C., was prepared from 3-amino-4-chloro - α-tert.-butylamino - acetophenone dihyhydrochloride.

EXAMPLE 44

Using a procedure analogous to that described in Example 7, 1-(4'-amino-3'-chloro-phenyl)-2-(γ-methoxy-n-propylamino)-propanol-(1) of the formula

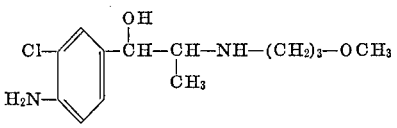

was prepared from 4-amino-3-chloro-α-(γ-methoxy-n-propylamino)-propiophenone hydrochloride. M.P. of dihydrochloride: 157–159° C.

EXAMPLE 45

Using a procedure analogous to that described in Example 7, 1-(4'-amino-3'-bromo-phenyl)-2-(2''-ethyl-piperidino)-propanol-(1), M.P. 140–141° C., of the formula

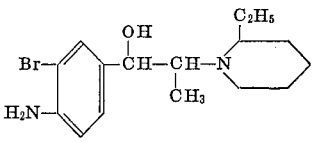

was prepared from 4-amino-3-bromo-α-(2'-ethyl-piperidino)-propiophenone.

The compounds according to the present invention, that is, those embraced by Formula I and their non-toxic, pharmacologically acceptable acid addition salts, have useful pharmacodynamic properties. More particularly, they exhibit strong analgesic activities in warm-blooded animals, such as mice, as evidenced by the following pharmacological tests.

1-(4' - amino - 3' - bromo-phenyl)-2-diethylamino-ethanol-(1), i.e. the compound of Example 5, was tested for analgesic activity and acute toxicity and compared with codeine phosphate in mice, using the standard tail-pinch method described by Haffner in Deutsche Medizinische Wochenschrift 1929, 731. The Dieffenbach clamp used in these tests exerted a pressure of 350-400 gm. when opened to a width corresponding to the average diameter of the root of a mouse tail. Adult male white mice of the NMRI-strain having an average body weight of 20 gm. were used. At least 20 animals per dose were used for each compound.

The compounds were administered to the animals perorally in aqueous solution by means of an esophageal sound. At intervals of 30 minutes subsequent to administration of each dose it was determined how many animals no longer reacted to the paw stimulus caused by application of the Dieffenbach clamp to the root of the tail. From these data the median effective analgesic dose ($ED_{50}$) was graphically determined, that is, the dose of each compound which causes a distinct suppression of the defensive reaction in 50% of the animals; the comparison of effectiveness was made at the point of time of maximum effectiveness which, as a rule, occurred 30 minutes after administration. The following table shows the results obtained:

TABLE I

| Compound | Number of doses | Animals per dose | $ED_{50}$, mgm./kg. | Relative effective strength |
|---|---|---|---|---|
| Codeine phosphate | 4 | 40 | 90.0 | 1.0 |
| Example 5 | 4 | 20 | 23.0 | 3.9 |

The results indicate that the compound of the instant invention is about four times more effective as an analgesic as codeine phosphate and thus a very strong analgesic.

The acute toxicity was also determined perorally on adult male while mice having an average body weight of 20 gm. The compounds under investigation were administered at varying doses perorally in admixture with methylcellulose by means of an esophageal sound, and the number of animals which perished within 24 hours was recorded for each dose. The median lethal dose ($LD_{50}$) was calculated by graphic extrapolation on a probability grid. The following table shows the results obtained:

TABLE II

| Compound | Number of doses | Animals per dose | $LD_{50}$, mgm./kg. |
|---|---|---|---|
| Codeine phosphate | 4 | 10 | 376 |
| Example 5 | 3 | 10 | 650 |

These results show that the compound of the present invention is significantly less toxic than codeine phosphate.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective analgesic dosage unit of the compounds according to the present invention is from 0.083 to 1.67 mgm./kg. body weight, preferably 0.33 to 0.84 mgm./kg.

The following examples illustrate a few dosage unit compositions comprising a compound of the instant invention as an active ingredient and represent the best mode contemplated of putting the invention to practical use. The parts are parts by weight unless otherwise specified.

EXAMPLE 46

Tablets

The tablet composition was compounded from the following ingredients:

| | Parts |
|---|---|
| 1 - (4'-amino-3'-bromo-phenyl)-2-ethylamino-ethanol hydrochloride | 50.0 |
| Lactose | 230.0 |
| Potato starch | 90.0 |
| Polyvinyl pyrrolidone | 12.0 |
| Colloidal silicic acid | 5.0 |
| Sodium cellulose glycolate | 8.0 |
| Magnesium stearate | 5.0 |
| Total | 400.0 |

Compounding procedure: The ethanol compound was intimately admixed with the lactose, potato starch and polyvinylpyrrolidone, the mixture was moistened with ethanol, the moist mass was forced through a 1.5 mm.-mesh screen, and the granulate thus obtained was dried at 45° C. and again passed through the screen. The dry granulate was admixed with the remaining ingredients, and the mixture was pressed into 400 mgm.-tablets. One tablet contained 50 mgm. of the ethanol compound and, when administered perorally to a warm-blooded animal of about 60 kg. body weight in need of such treatment, produced very good analgesic effects.

EXAMPLE 47

Coated pills

The pill core composition was compounded from the following ingredients:

| | Parts |
|---|---|
| 1-(4'-amino - 3' - chloro-phenyl)-2-ethylamino-ethanolhydrochloride | 20.0 |
| Colloidal silicic acid | 10.0 |
| Lactose | 118.0 |
| Potato starch | 60.0 |
| Polyvinylpyrrolidone | 6.0 |
| Sodium cellulose glycolate | 4.0 |
| Magnesium stearate | 2.0 |
| Total | 220.0 |

Compounding procedure: The ingredients were admixed and granulated as described in Example 46, and the composition was pressed into 220 mgm.-pill cores, which were then coated with a thin shell consisting essentially of sugar and talcum and polished with beeswax. One coated pill contained 20 mgm. of the ethanol compound and, when administered perorally to a warm-blooded animal of about 60 kg. body weight in need of such treatment, produced very good analgesic effects.

EXAMPLE 48

Hypodermic solution

The solution was compounded from the following ingredients:

| | Parts |
|---|---|
| 1 - (4'-amino-3'-bromo-phenyl)-2-ethylamino-ethanol hydrochloride | 10.0 |
| Sorbitol | 100.0 |
| Distilled water, q.s.ad., 2000.0 parts by vol. | |

Compounding procedure: The ethanol compound and sorbitol wered issolved in a sufficient amount of distilled water, and the solution was diluted with more distilled water to the indicated volume and filtered until free from suspended particles. The filtrate was filled into 2 cc.-ampules which were then sealed and sterilized for 20 minutes at 120° C. One ampule contained 10 mgm. of the ethanol compound, and when the contents thereof were administered intraveneously to a warm-blooded animal

EXAMPLE 49

Suppositories

The suppository composition was compounded from the following ingredients:

| | Parts |
|---|---|
| 1-(4'-amino-3'-chloro-phenyl)-2-ethyl-amino-ethanol hydrochloride | 40.0 |
| Cocoa butter | 1660.0 |
| Total | 1700.0 |

Compounding procedure: The cocoa butter was melted and cooled to 40° C., the finely pulverized ethanol compound was stired into it with the aid of an immersion homogenizer, and the mixture was poured at 36° C. into coled suppository molds, each holding 1700 mgm. of the mixture. One suppository contained 40 mgm. of the ethanol compound and, when administered by the rectal route to a warm-blooded animal of about 60 kg. body weight in need of such treatment, produced very good analgesic effects.

EXAMPLE 50

Drop solution

The solution was compounded from the following ingredients:

| | Parts |
|---|---|
| 1-(4'-amino-3'-bromo-phenyl)-2-ethyl-amino-ethanol hydrochloride | 2.0 |
| 1,2-propyleneglycol | 15.0 |
| Saccharin sodium | 0.01 |
| p-Hydroxybenzoic acid methyl ester | 0.035 |
| p-Hydroxybenzoic acid propyl ester | 0.015 |
| Distilled water, q.s.ad 100.0 parts by vol. | |

Compounding procedure: The p-hydroxybenzoic acid esters were dissolved in about 90% of the required amount of distilled water at 80° C., the solution was allowed to cool to room temperature, and then the ethanol compound and the saccharin sodium were dissolved therein and the propyleneglycol was added. The resulting solution was diluted to the indicated volume with additional distilled water and was then filtered until free from fibrous material. 1 cc. of the solution (about 20 drops) contained 20 mgm. of the ethanol compound and, when administered perorally to a warm-blooded animal of about 60 kg. body weight in need of such treatment, produced very good analgesic effects.

Although the above dosage unit composition examples illustrate only two compounds of the present invention as an active ingredient, it should be understood that any other compound embraced by Formula I or a non-toxic acid addition salt thereof may be substituted for the particular ethanol compound in Examples 46 through 50. Moreover, the amount of active ingredient in these examples may be varied to achieve the dosage unit range set forth above, and the amounts and nature of the inert pharmaceutical carrier ingredients may be varied to meet particular requirements.

While the present invention has been illustrated with the air of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

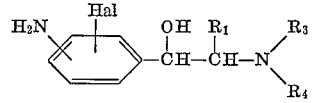

wherein $R_1$ is hydrogen or alkyl of 1 to 3 carbon atoms, $R_3$ and $R_4$ are each hydrogen, lower alkyl, lower alkenyl, hydroxy-lower alkyl, lower alkoxy-lower alkyl, cyclohexyl, phenyl or benzyl, and Hal is chlorine, bromine or iodine, or a non-toxic, pharmacologically acceptable acid addition salt thereof.

2. A compound of the formula

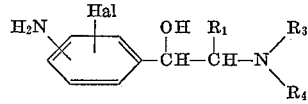

wherein $R_1$ is hydrogen or alkyl of 1 to 2 carbon atoms, $R_3$ is hydrogen, alkyl of 1 to 4 carbon atoms, allyl, hydroxyethyl, methoxy-propyl, phenyl, benzyl or cyclohexyl, $R_4$ is hydrogen, alkyl of 1 to 3 carbon atoms, allyl or benzyl, and Hal is chlorine, bromine or iodine, or a non-toxic, pharmacologically acceptable acid addition salt thereof.

3. A compound according to claim 2, which is 1-(4'-amino-3'-bromo-phenyl)-2-ethylamino-ethanol or a non-toxic, pharmacologically acceptable acid addition salt thereof.

4. A compound according to claim 2, which is 1-(4'-amino-3'-chloro-phenyl)-2-ethylamino-ethanol or a non-toxic, pharmacologically acceptable acid addition salt thereof.

References Cited

UNITED STATES PATENTS 3,281,468   10/1966   Mills _____ 260—570.8

ROBERT V. HINES, Primary Examiner

U.S. Cl. X.R.

260—239, 247.2, 247.5, 268, 294, 294.7, 325, 326.3, 326.5, 326.85, 501.17, 501.18, 501.2, 558, 559, 562, 567.5 570.5, 570.6, 575, 578; 424—244, 248, 250, 253, 268, 274, 330

FO-1050
(5/69)

UNITED STATES PATENT OFFICE
CERTIFICATE OF CORRECTION

Patent No. 3,574,211          Dated April 6, 1971

Inventor(s) JOHANNES KECK, GERD KRUGER, HANS MACHLEIDT, KLAUS ~~GUNTHER ENGELHARDT and ALBRECHT ECKENFELS~~

It is certified that error appears in the above-identified patent and that said Letters Patent are hereby corrected as shown below:

Col. 3, line 9: correct the spelling of "simultaneously".
"   4, "  54: "acid" should read --aid--;
"   "  "  63: erase the comma after "R4".
"   6, "  21: "chloro" should read --bromo--;
"   "  "  32: "hyroxide" should read --hydroxide--.
"   7, "  63: "prenyl" should read --phenyl--.
"   8, "  18- "dimethylamino-aceto-one" should read
           19: --morpholino-aceto-phenone--.
"  11, "   5: "penyl" should read --phenyl--;
"   "  "  13: correct the formula to read

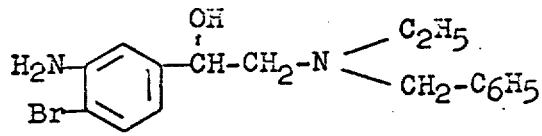

Col.11, line 20: "3-bromo" should read --3'-bromo--;
"   "  "  28: "dimethyl" should read --dimethylamino--;
"   "  "  49: "benxylamino" should read --benzylamino--;
"   "  "  56: "benyl" should read --benzyl--.
Col.12, "   2: correct the formula to read

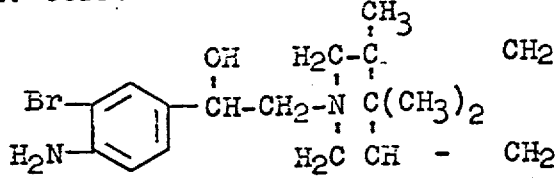

Col.13, line 67: correct the formula to read

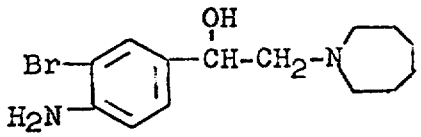

Col. 16, line 68: correct the spelling of "were dissolved".
"   17, "  17: correct the spelling of "stirred";
"   "  "  19: correct the spelling of "cooled".

Signed and sealed this 17th day of August 1971.

(SEAL)
Attest:

EDWARD M. FLETCHER, JR.          WILLIAM E. SCHUYLER,
Attesting Officer                Commissioner of Patent